United States Patent
Gong et al.

(10) Patent No.: US 12,216,248 B2
(45) Date of Patent: Feb. 4, 2025

(54) OPTICAL IMAGING LENS ASSEMBLY

(71) Applicant: Zhejiang Sunny Optics Co., Ltd, Yuyao (CN)

(72) Inventors: Tingting Gong, Yuyao (CN); Litong Song, Yuyao (CN); Fujian Dai, Yuyao (CN); Liefeng Zhao, Yuyao (CN)

(73) Assignee: Zhejiang Sunny Optics Co., Ltd (CN)

(*) Notice: Subject to any disclaimer, the term of this patent is extended or adjusted under 35 U.S.C. 154(b) by 534 days.

(21) Appl. No.: 17/689,387

(22) Filed: Mar. 8, 2022

(65) Prior Publication Data
US 2022/0334359 A1    Oct. 20, 2022

(30) Foreign Application Priority Data

Apr. 13, 2021   (CN) .......................... 202110394625.0

(51) Int. Cl.
*G02B 13/00*    (2006.01)
*G02B 9/12*     (2006.01)

(52) U.S. Cl.
CPC ........... *G02B 13/0035* (2013.01); *G02B 9/12* (2013.01)

(58) Field of Classification Search
CPC ...... G02B 9/12; G02B 13/0035; G02B 13/06; G02B 13/18; G02B 27/0025
See application file for complete search history.

(56) References Cited

U.S. PATENT DOCUMENTS

| | | | | |
|---|---|---|---|---|
| 8,189,276 B1* | 5/2012 | Hsu | ................... | G02B 13/0035 359/716 |
| 8,456,761 B2* | 6/2013 | Ko | ................... | G02B 13/0035 359/716 |
| 12,055,688 B2* | 8/2024 | Li | ........................... | G02B 9/60 |
| 2010/0226020 A1* | 9/2010 | Asami | .................... | G02B 13/18 359/716 |
| 2018/0224638 A1* | 8/2018 | Uchida | .............. | A61B 1/00096 |
| 2019/0196141 A1* | 6/2019 | Wang | .................... | G02B 13/18 |

FOREIGN PATENT DOCUMENTS

| | | |
|---|---|---|
| CN | 102608730 A | 7/2012 |
| CN | 111781703 A | 10/2020 |
| TW | 201316025 A | 4/2013 |

OTHER PUBLICATIONS

First Office Action for Application No. 202110394625.0, dated May 16, 2022, 7 pages.

* cited by examiner

*Primary Examiner* — Mustak Choudhury
(74) *Attorney, Agent, or Firm* — Barnes & Thornburg LLP

(57) ABSTRACT

An optical imaging lens assembly includes, sequentially along an optical axis from an object side to an image side: a first lens, having a negative refractive power, an image-side surface of the first lens being a concave surface; a second lens, having a positive refractive power, an object-side surface of the second lens being a convex surface; and a third lens, having a refractive power, an object-side surface of the third lens being a convex surface. A Half of a diagonal length ImgH of an effective pixel area on an image plane of the optical imaging lens assembly, an effective focal length f of the optical imaging lens assembly and an entrance pupil diameter EPD of the optical imaging lens assembly satisfy: 3 mm<ImgH×f/EPD<4 mm. A maximal field-of-view FOV of the optical imaging lens assembly and the effective focal length f of the optical imaging lens assembly satisfy: 1 mm<tan(FOV/2)×f<2 mm.

20 Claims, 9 Drawing Sheets

OPTICAL IMAGING LENS ASSEMBLY

CROSS-REFERENCE TO RELATED APPLICATIONS

This application claims benefit of priority to Chinese Patent Application No. 202110394625.0 filed on Apr. 13, 2021 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

With the acceleration of the pace of life, smart devices such as sweeping robots and unmanned aerial vehicles are increasingly favored by people. In order to further improve the characteristics (such as miniaturization, high precision and portability) of the smart devices, it is required to further improve obstacle avoidance imaging lens assemblies arranged on the smart devices. A main function of the obstacle avoidance lens assemblies is to identify obstacles, and thus the lens assemblies need to have the characteristics such as a wide angle, a small distortion and a high imaging quality. However, the current common obstacle avoidance imaging lens assemblies have a large number of lenses, which leads to a heavy weight and makes a compression in size difficult.

Therefore, for the above problems, it is desirable to provide an optical imaging lens assembly. The optical imaging lens assembly can have an ultra wide angle, a small distortion and a small size at the same time, under the premise of ensuring the performance of the obstacle avoidance lens assembly.

SUMMARY

In an aspect of the present disclosure, an optical imaging lens assembly is provided, and the optical imaging lens assembly includes, sequentially along an optical axis from an object side to an image side: a first lens having a negative refractive power, an image-side surface of the first lens being a concave surface; a second lens having a positive refractive power, an object-side surface of the second lens being a convex surface; and a third lens having a refractive power, an object-side surface of the third lens being a convex surface. A half of a diagonal length ImgH of an effective pixel area on an image plane of the optical imaging lens assembly, an effective focal length f of the optical imaging lens assembly, and an entrance pupil diameter EPD of the optical imaging lens assembly may satisfy: 3 mm<ImgH× f/EPD<4 mm. A maximal field-of-view FOV of the optical imaging lens assembly and an effective focal length f of the optical imaging lens assembly may satisfy: 1 mm<tan(FOV/ 2)×f<2 mm.

In an implementation, the half of the diagonal length ImgH of the effective pixel area on the image plane of the optical imaging lens assembly and the effective focal length f of the optical imaging lens assembly may satisfy: 1.5<ImgH/f<2.

In an implementation, a maximal distortion DISTmax of the optical imaging lens assembly may satisfy: |DISTmax|<6%.

In an implementation, an effective focal length f1 of the first lens and the effective focal length f of the optical imaging lens assembly may satisfy: −1.3<f1/f<−0.8.

In an implementation, an effective focal length f1 of the first lens, an effective focal length f3 of the third lens and an effective focal length f2 of the second lens may satisfy: 0<(f1+f3)/f2<0.5.

In an implementation, a radius of curvature R3 of the object-side surface of the second lens and a radius of curvature R6 of an image-side surface of the third lens may satisfy: −1.5<R3/R6<−1.

In an implementation, a center thickness CT1 of the first lens on the optical axis and a center thickness CT2 of the second lens on the optical axis may satisfy: 0.3<CT1/ CT2<1.

In an implementation, a center thickness CT1 of the first lens on the optical axis and a center thickness CT3 of the third lens on the optical axis may satisfy: 0.3<CT1/CT3<0.7.

In an implementation, a maximal effective radius DT11 of an object-side surface of the first lens and a maximal effective radius DT32 of an image-side surface of the third lens may satisfy: 2<DT11/DT32<2.5.

In an implementation, the center thickness CT1 of the first lens on the optical axis and the maximal effective radius DT11 of the object-side surface of the first lens may satisfy: 0.2<CT1/DT11<0.5.

In an implementation, a maximal effective radius DT21 of the object-side surface of the second lens and the maximal effective radius DT32 of the image-side surface of the third lens may satisfy: 0.9<DT21/DT32<1.3.

In an implementation, a maximal effective radius DT12 of the image-side surface of the first lens and a maximal effective radius DT31 of the object-side surface of the third lens may satisfy: 1.3<DT12/DT31<2.

In an implementation, a maximal effective radius DT12 of the image-side surface of the first lens and a maximal effective radius DT21 of the object-side surface of the second lens may satisfy: 1<DT12/DT21<1.2.

In an implementation, the center thickness CT1 of the first lens on the optical axis and an axial distance SAG12 from an intersection point of the image-side surface of the first lens and the optical axis to a vertex of an effective radius of the image-side surface of the first lens may satisfy: 0.5<CT1/ SAG12<1.

In an implementation, the maximal effective radius DT11 of the object-side surface of the first lens and the half of the diagonal length ImgH of the effective pixel area on the image plane of the optical imaging lens assembly may satisfy: 1<DT11/ImgH<1.3.

In an implementation, an axial distance SAG21 from an intersection point of the object-side surface of the second lens and the optical axis to a vertex of an effective radius of the object-side surface of the second lens and the center thickness CT2 of the second lens on the optical axis may satisfy: 0.2<SAG21/CT2<1.

In an implementation, a distance TTL from the object-side surface of the first lens to the image plane of the optical imaging lens assembly along the optical axis and the half of the diagonal length ImgH of the effective pixel area on the image plane of the optical imaging lens assembly may satisfy: 2<TTL/ImgH<3.

In another aspect of the present disclosure, an optical imaging lens assembly is provided, and the optical imaging lens assembly includes, sequentially along an optical axis from an object side to an image side: a first lens having a negative refractive power, an image-side surface of the first lens being a concave surface; a second lens having a positive refractive power, an object-side surface of the second lens being a convex surface; and a third lens having a refractive power, an object-side surface of the third lens being a convex surface. A half of a diagonal length ImgH of an effective pixel area on an image plane of the optical imaging lens assembly, an effective focal length f of the optical imaging lens assembly, and an entrance pupil diameter EPD of the optical imaging lens assembly may satisfy: 3 mm<ImgH×f/EPD<4 mm. The half of the diagonal length ImgH of the effective pixel area on the image plane of the optical imaging lens assembly and the effective focal length f of the optical imaging lens assembly may satisfy: 1.5<ImgH/f<2.

In an implementation, a maximal distortion DISTmax of the optical imaging lens assembly may satisfy: |DISTmax|<6%.

In an implementation, a maximal field-of-view FOV of the optical imaging lens assembly and an effective focal length f of the optical imaging lens assembly may satisfy: 1 mm<tan(FOV/2)×f<2 mm.

In an implementation, an effective focal length f1 of the first lens and the effective focal length f of the optical imaging lens assembly may satisfy: −1.3<f1/f<−0.8.

In an implementation, an effective focal length f1 of the first lens, an effective focal length f3 of the third lens and an effective focal length f2 of the second lens may satisfy: 0<(f1+f3)/f2<0.5.

In an implementation, a radius of curvature R3 of the object-side surface of the second lens and a radius of curvature R6 of an image-side surface of the third lens may satisfy: −1.5<R3/R6<−1.

In an implementation, a center thickness CT1 of the first lens on the optical axis and a center thickness CT2 of the second lens on the optical axis may satisfy: 0.3<CT1/CT2<1.

In an implementation, a center thickness CT1 of the first lens on the optical axis and a center thickness CT3 of the third lens on the optical axis may satisfy: 0.3<CT1/CT3<0.7.

In an implementation, a maximal effective radius DT11 of an object-side surface of the first lens and a maximal effective radius DT32 of an image-side surface of the third lens may satisfy: 2<DT11/DT32<2.5.

In an implementation, the center thickness CT1 of the first lens on the optical axis and the maximal effective radius DT11 of the object-side surface of the first lens may satisfy: 0.2<CT1/DT11<0.5.

In an implementation, a maximal effective radius DT21 of the object-side surface of the second lens and the maximal effective radius DT32 of the image-side surface of the third lens may satisfy: 0.9<DT21/DT32<1.3.

In an implementation, a maximal effective radius DT12 of the image-side surface of the first lens and a maximal effective radius DT31 of the object-side surface of the third lens may satisfy: 1.3<DT12/DT31<2.

In an implementation, a maximal effective radius DT12 of the image-side surface of the first lens and a maximal effective radius DT21 of the object-side surface of the second lens may satisfy: 1<DT12/DT21<1.2.

In an implementation, the center thickness CT1 of the first lens on the optical axis and an axial distance SAG12 from an intersection point of the image-side surface of the first lens and the optical axis to a vertex of an effective radius of the image-side surface of the first lens may satisfy: 0.5<CT1/SAG12<1.

In an implementation, the maximal effective radius DT11 of the object-side surface of the first lens and the half of the diagonal length ImgH of the effective pixel area on the image plane of the optical imaging lens assembly may satisfy: 1<DT11/ImgH<1.3.

In an implementation, an axial distance SAG21 from an intersection point of the object-side surface of the second lens and the optical axis to a vertex of an effective radius of the object-side surface of the second lens and the center thickness CT2 of the second lens on the optical axis may satisfy: 0.2<SAG21/CT2<1.

In an implementation, a distance TTL from the object-side surface of the first lens to the image plane of the optical imaging lens assembly along the optical axis and the half of the diagonal length ImgH of the effective pixel area on the image plane of the optical imaging lens assembly may satisfy: 2<TTL/ImgH<3.

The present disclosure adopts a three-piece lens structure. Through a reasonable distribution of refractive powers and an optimal selection for surface types and thicknesses, the optical imaging lens assembly can have at least one beneficial effect such as an ultra wide angle, a small distortion, a small size and a high imaging quality.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings.

DETAILED DESCRIPTION OF EMBODIMENTS

Figure 1:
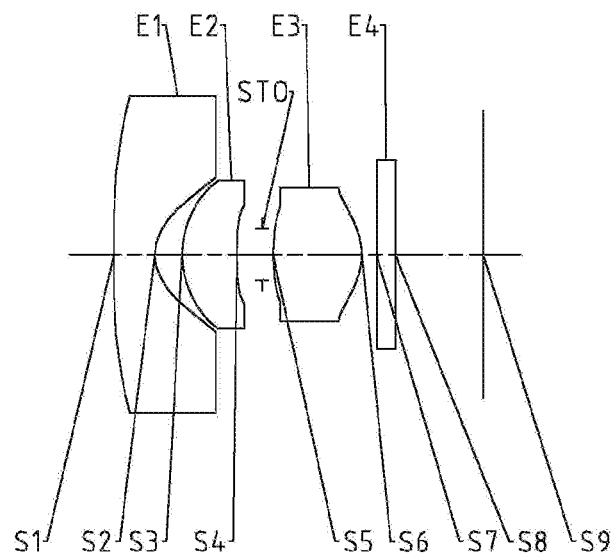
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least in the paraxial area. If the lens surface is a flat surface and the position of the flat surface is not defined, it represents that the lens surface is a flat surface at least in the paraxial area. Herein, in each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include, for example, three lenses having refractive powers (i.e., a first lens, a second lens and a third lens). The three lenses are arranged in sequence along an optical axis from an object side to an image side.

In the exemplary implementations, the first lens may have a negative refractive power, the second lens may have a positive refractive power, and the third lens may have a positive refractive power or a negative refractive power. By reasonably controlling the refractive powers of the three lenses, various aberrations of the optical system can be effectively balanced, thereby improving the imaging quality of the lens assembly.

In the exemplary implementations, an image-side surface of the first lens may be a concave surface, an object-side surface of the second lens may be a convex surface, and an object-side surface of the third lens may be a convex surface. The surface types of the lenses are reasonably controlled, which can be conducive to reducing the ghost image and stray light of the optical system, thereby improving the imaging quality of the lens assembly.

In the exemplary implementations, the optical imaging lens assembly of the present disclosure may satisfy a conditional expression: 3 mm<ImgH×f/EPD<4 mm. Here, ImgH is a half of a diagonal length of an effective pixel area on an image plane of the optical imaging lens assembly, f is an effective focal length of the optical imaging lens assembly, and EPD is an entrance pupil diameter of the optical imaging lens assembly. By controlling the half of the diagonal length of the effective pixel area on the image plane of the optical imaging lens assembly, the effective focal length of the optical imaging lens assembly and the entrance pupil diameter of the optical imaging lens assembly to satisfy 3 mm<ImgH×f/EPD<4 mm, the optical imaging lens assembly may have a small size under the premise of ensuring the light concentrating capability of the optical system. More specifically, ImgH, f and EPD may satisfy: 3.4 mm<ImgH×f/EPD<3.8 mm.

In the exemplary implementations, the optical imaging lens assembly of the present disclosure may satisfy a conditional expression: 1 mm<tan(FOV/2)×f<2 mm. Here, FOV is the maximal field-of-view of the optical imaging lens assembly, and f is the effective focal length of the optical imaging lens assembly. By controlling the maximal field-of-view of the optical imaging lens assembly and the effective focal length of the optical imaging lens assembly to satisfy 1 mm<tan(FOV/2)×f<2 mm, the optical imaging lens assembly may have a large field-of-view. At the same time, the controlling is conducive to correcting the distortion of the optical system. More specifically, FOV and f may satisfy: 1.4 mm<tan(FOV/2)×f<1.7 mm.

In the exemplary implementations, the optical imaging lens assembly of the present disclosure may satisfy a conditional expression: 1.5<ImgH/f<2. Here, ImgH is the half of the diagonal length of the effective pixel area on the image plane of the optical imaging lens assembly, and f is the effective focal length of the optical imaging lens assembly. The ratio of the half of the diagonal length of the effective pixel area on the image plane of the optical imaging lens assembly to the effective focal length of the optical imaging lens assembly is controlled within this range, which can be conducive to shortening the total track length of the optical imaging system, thereby making the optical system smaller. More specifically, ImgH and f may satisfy: 1.7<ImgH/f<1.9.

In the exemplary implementations, the optical imaging lens assembly of the present disclosure may satisfy a conditional expression: |DISTmax|<6%. Here, DISTmax is a maximal distortion of the optical imaging lens assembly. By controlling the maximal distortion of the optical imaging lens assembly to satisfy |DISTmax|<6%, the degree of distortion of the lens assembly during the imaging can be effectively controlled, thereby improving the imaging quality of the system, and the feasibility and reliability of the later image correction and restoration by software can be ensured. More specifically, DISTmax may satisfy: |DISTmax|<5.2%.

In the exemplary implementations, the optical imaging lens assembly of the present disclosure may satisfy a conditional expression: −1.3<f1/f<−0.8. Here, f1 is an effective focal length of the first lens, and f is the effective focal length of the optical imaging lens assembly. The ratio of the effective focal length of the first lens to the effective focal length of the optical imaging lens assembly is controlled within this range, which can be conducive to controlling the refractive power of the first lens, thereby playing a role of correcting the spherical aberration of the optical imaging lens assembly, and thus the optical performance of the lens assembly is improved. More specifically, f1 and f may satisfy: −1.2<f1/f<−0.9.

In the exemplary implementations, the optical imaging lens assembly of the present disclosure may satisfy a conditional expression: 0<(f1+f3)/f2<0.5. Here, f1 is an effective focal length of the first lens, f3 is an effective focal length of the third lens, and f2 is an effective focal length of the second lens. By controlling the ratio of the sum of the effective focal length of the first lens and the effective focal length of the third lens to the effective focal length of the second lens within this range, the refractive powers of the three lenses can be reasonably distributed, thereby effectively correcting the distortion and spherical aberration of the optical system, and reducing the ghost image of the optical system. More specifically, f1, f3 and f2 may satisfy: 0<(f1+f3)/f2<0.4.

In the exemplary implementations, the optical imaging lens assembly of the present disclosure may satisfy a conditional expression: −1.5<R3/R6<−1. Here, R3 is a radius of curvature of the object-side surface of the second lens, and R6 is a radius of curvature of an image-side surface of the third lens. The ratio of the radius of curvature of the object-side surface of the second lens to the radius of curvature of the image-side surface of the third lens is controlled within this range, which can be conducive to correcting the lateral chromatic aberration and field curvature of the optical system, thereby improving the imaging quality of the lens assembly. More specifically, R3 and R6 may satisfy: −1.5<R3/R6<−1.2.

In the exemplary implementations, the optical imaging lens assembly of the present disclosure may satisfy a conditional expression: 0.3<CT1/CT2<1. Here, CT1 is a center thickness of the first lens on the optical axis, and CT2 is a center thickness of the second lens on the optical axis. By controlling the ratio of the center thickness of the first lens on the optical axis to the center thickness of the second lens on the optical axis within this range, the axial chromatic aberration of the optical system can be effectively corrected, and the assemblability of the lens assembly can be improved. More specifically, CT1 and CT2 may satisfy: 0.3<CT1/CT2<0.9.

In the exemplary implementations, the optical imaging lens assembly of the present disclosure may satisfy a conditional expression: 0.3<CT1/CT3<0.7. Here, CT1 is the center thickness of the first lens on the optical axis, and CT3 is a center thickness of the third lens on the optical axis. By controlling the ratio of the center thickness of the first lens on the optical axis to the center thickness of the third lens on the optical axis within this range, the center thicknesses of the first lens and the third lens can be reasonably distributed, thereby achieving the effects of correcting the distortion and spherical aberration of the optical system, and thus, the reliability of the optical system is improved. More specifically, CT1 and CT3 may satisfy: 0.4<CT1/CT3<0.6.

In the exemplary implementations, the optical imaging lens assembly of the present disclosure may satisfy a conditional expression: 2<DT11/DT32<2.5. Here, DT11 is a maximal effective radius of an object-side surface of the first lens, and DT32 is a maximal effective radius of the image-side surface of the third lens. By controlling the ratio of the maximal effective radius of the object-side surface of the first lens to the maximal effective radius of the image-side surface of the third lens within this range, the off-axis aberration and axial chromatic aberration of the optical system can be effectively balanced, thereby improving the imaging quality of the lens assembly. More specifically, DT11 and DT32 may satisfy: 2.2<DT11/DT32<2.4.

In the exemplary implementations, the optical imaging lens assembly of the present disclosure may satisfy a conditional expression: 0.2<CT1/DT11<0.5. Here, CT1 is the center thickness of the first lens on the optical axis, and DT11 is the maximal effective radius of the object-side surface of the first lens. The ratio of the center thickness of the first lens on the optical axis to the maximal effective radius of the object-side surface of the first lens is controlled within this range, which can be conducive to correcting the spherical aberration and distortion of the optical system, and weakening the stray light generated by the first lens. More specifically, CT1 and DT11 may satisfy: 0.2<CT1/DT11<0.3.

In the exemplary implementations, the optical imaging lens assembly of the present disclosure may satisfy a conditional expression: 0.9<DT21/DT32<1.3. Here, DT21 is a maximal effective radius of the object-side surface of the second lens, and DT32 is the maximal effective radius of the image-side surface of the third lens. By controlling the ratio of the maximal effective radius of the object-side surface of the second lens to the maximal effective radius of the image-side surface of the third lens within this range, the distortion and astigmatism of the optical system can be effectively reduced. At the same time, the controlling is conducive to the assemblability of the lens assembly, thereby improving the yield. More specifically, DT21 and DT32 may satisfy: 0.9<DT21/DT32<1.2.

In the exemplary implementations, the optical imaging lens assembly of the present disclosure may satisfy a conditional expression: $1.3<DT12/DT31<2$. Here, DT12 is a maximal effective radius DT12 of the image-side surface of the first lens, and DT31 is a maximal effective radius of the object-side surface of the third lens. The ratio of the maximal effective radius of the image-side surface of the first lens to the maximal effective radius of the object-side surface of the third lens is controlled within this range, which can be conducive to the uniform distribution of light, thereby improving the brightness of the image plane and preventing the vignetting. Moreover, the assemblability of the lens assembly can be improved. More specifically, DT12 and DT31 may satisfy: $1.3<DT12/DT31<1.8$.

In the exemplary implementations, the optical imaging lens assembly of the present disclosure may satisfy a conditional expression: $1<DT12/DT21<1.2$. Here, DT12 is the maximal effective radius of the image-side surface of the first lens, and DT21 is the maximal effective radius of the object-side surface of the second lens. By controlling the ratio of the maximal effective radius of the image-side surface of the first lens to the maximal effective radius of the object-side surface of the second lens within this range, it may effectively correct the field curvature of the optical imaging lens assembly, and weaken the sensitivity of the lens assembly. More specifically, DT12 and DT21 may satisfy: $1<DT12/DT21<1.1$.

In the exemplary implementations, the optical imaging lens assembly of the present disclosure may satisfy a conditional expression: $0.5<CT1/SAG12<1$. Here, CT1 is the center thickness of the first lens on the optical axis, and SAG12 is an axial distance from an intersection point of the image-side surface of the first lens and the optical axis to a vertex of an effective radius of the image-side surface of the first lens. By controlling the ratio of the center thickness of the first lens on the optical axis to the axial distance from the intersection point of the image-side surface of the first lens and the optical axis to the vertex of the effective radius of the image-side surface of the first lens within this range, the spherical aberration of the optical system can be corrected, which is conducive to the molding and assembly of the lens and reducing the sensitivity of the lens assembly. More specifically, CT1 and SAG12 may satisfy: $0.5<CT1/SAG12<0.8$.

In the exemplary implementations, the optical imaging lens assembly of the present disclosure may satisfy a conditional expression: $1<DT11/ImgH<1.3$. Here, DT11 is the maximal effective radius of the object-side surface of the first lens, and ImgH is the half of the diagonal length of the effective pixel area on the image plane of the optical imaging lens assembly. By controlling the ratio of the maximal effective radius of the object-side surface of the first lens to the half of the diagonal length of the effective pixel area on the image plane of the optical imaging lens assembly within this range, the size of the optical imaging lens assembly can be effectively controlled, thereby realizing the miniaturization of the lens assembly. More specifically, DT11 and ImgH may satisfy: $1<DT11/ImgH<1.2$.

In the exemplary implementations, the optical imaging lens assembly of the present disclosure may satisfy a conditional expression: $0.2<SAG21/CT2<1$. Here, SAG21 is an axial distance from an intersection point of the object-side surface of the second lens and the optical axis to a vertex of an effective radius of the object-side surface of the second lens, and CT2 is the center thickness of the second lens on the optical axis. The ratio of the axial distance from the intersection point of the object-side surface of the second lens and the optical axis to the vertex of the effective radius of the object-side surface of the second lens to the center thickness of the second lens on the optical axis is controlled within this range, which can be conducive to balancing the field curvature and chromatic aberration of the lens assembly, and thus, the sensitivity of the lens assembly is reduced and the yield rate of the lens assembly is improved. More specifically, SAG21 and CT2 may satisfy: $0.2<SAG21/CT2<0.8$.

In the exemplary implementations, the optical imaging lens assembly of the present disclosure may satisfy a conditional expression: $2<TTL/ImgH<3$. Here, TTL is a distance from the object-side surface of the first lens to the image plane of the optical imaging lens assembly along the optical axis, and ImgH is the half of the diagonal length of the effective pixel area on the image plane of the optical imaging lens assembly. The ratio of the distance from the object-side surface of the first lens to the image plane of the optical imaging lens assembly along the optical axis to the half of the diagonal length of the effective pixel area on the image plane of the optical imaging lens assembly is controlled within this range, which can be conducive to shortening the total track length of the optical imaging lens assembly, thus making the optical system smaller. More specifically, TTL and ImgH may satisfy: $2.5<TTL/ImgH<2.9$.

In the exemplary implementations, the above optical imaging lens assembly may further include at least one diaphragm. The diaphragm may be disposed at an appropriate position as required. For example, the diaphragm is disposed between the second lens and the third lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, the above three lenses. By reasonably distributing the refractive powers and the surface types of the lenses, the center thicknesses of the lenses, the axial spacings between the lenses, etc., it may be effectively ensured that the lens assembly has characteristics such as an ultra wide angle, a small distortion, a small size and a high imaging quality.

In the implementations of the present disclosure, at least one of the surfaces of the lenses is an aspheric surface. That is, at least one of the surfaces from the object-side surface of the first lens to the image-side surface of the third lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens and the third lens is an aspheric surface. Alternatively, the object-side surface and the image-side surface of each of the first lens, the second lens and the third lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having three lenses is described as an example in the implementations, the optical imaging lens assembly is not limited to including the three lenses. If desired, the optical imaging lens assembly may also include other numbers of lenses.

Specific embodiments of the optical imaging lens assembly that may be applicable to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram of the optical imaging lens assembly according to Embodiment 1 of the present disclosure.

As shown in FIG. 1, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 1 shows basic parameters of the optical imaging lens assembly in Embodiment 1. Here, the units of a radius of curvature and a thickness/distance are millimeters (mm).

TABLE 1

| surface number | surface type | radius of curvature | thickness/ distance | refractive index (material) | abbe number (material) | conic coefficient |
|---|---|---|---|---|---|---|
| OBJ | spherical | infinite | 450.0000 | | | |
| S1 | aspheric | 781.1910 | 0.4564 | 1.54 | 55.7 | 99.9000 |
| S2 | aspheric | 0.4900 | 0.3054 | | | −0.7632 |
| S3 | aspheric | 0.9242 | 0.6149 | 1.67 | 20.4 | −1.2159 |
| S4 | aspheric | 4.9200 | 0.2829 | | | 46.9354 |
| STO | spherical | infinite | 0.1207 | | | |
| S5 | aspheric | 2.1119 | 0.9949 | 1.55 | 56.1 | 0.0000 |
| S6 | aspheric | −0.7330 | 0.1634 | | | −1.1237 |
| S7 | spherical | infinite | 0.2100 | 1.52 | 64.2 | |
| S8 | spherical | infinite | 0.9839 | | | |
| S9 | spherical | infinite | | | | |

In Embodiment 1, the object-side surface and the image-side surface of any lens in the first to third lenses E1-E3 are both aspheric surfaces, and the surface type x of each aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Table 2 below gives the high-order coefficients $A_4$, $A_6$, $A_8$, $A_{11}$, $A_{12}$, $A_{14}$, $A_{16}$, $A_{18}$ and $A_{20}$ applicable to the aspheric surfaces S1-S6 in Embodiment 1.

TABLE 2

| surface number | A4 | A6 | A8 | A10 | A12 |
|---|---|---|---|---|---|
| S1 | 1.4038E−02 | 9.0196E−02 | −1.5241E−01 | 1.3568E−01 | −7.8687E−02 |
| S2 | −2.4589E−01 | −8.9770E+00 | 9.6897E+01 | −5.4500E+02 | 1.8672E+03 |
| S3 | −4.8529E−01 | 4.3131E+00 | −3.3606E+01 | 1.8686E+02 | −6.3086E+02 |
| S4 | 4.8430E−01 | −1.3904E+01 | 3.1748E+02 | −3.8996E+03 | 2.9015E+04 |

TABLE 2-continued

| | | | | | |
|---|---|---|---|---|---|
| S5 | −6.0866E−01 | 2.4196E+01 | −4.4708E+02 | 5.1219E+03 | −3.7185E+04 |
| S6 | 3.7388E−01 | −4.3539E+00 | 4.5108E+01 | −2.6560E+02 | 9.9680E+02 |

| surface number | A14 | A16 | A18 | A20 |
|---|---|---|---|---|
| S1 | 3.0388E−02 | −7.4739E−03 | 1.0524E−03 | −6.4308E−05 |
| S2 | −3.9403E+03 | 4.9286E+03 | −3.3312E+03 | 9.3437E+02 |
| S3 | 1.3108E+03 | −1.6787E+03 | 1.2348E+03 | −4.0043E+02 |
| S4 | −1.3389E+05 | 3.7523E+05 | −5.8367E+05 | 3.8574E+05 |
| S5 | 1.7117E+05 | −4.8392E+05 | 7.6623E+05 | −5.1994E+05 |
| S6 | −2.3839E+03 | 3.5158E+03 | −2.9097E+03 | 1.0326E+03 |

Figure 2A:
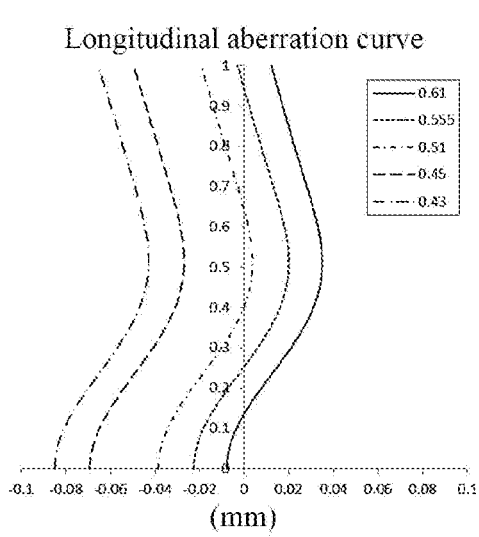
FIGS. 2A-2D respectively illustrate a longitudinal aberration curve, an astigmatic curve, a distortion curve and a lateral color curve of the optical imaging lens assembly in Embodiment 1.
Figure 2B:
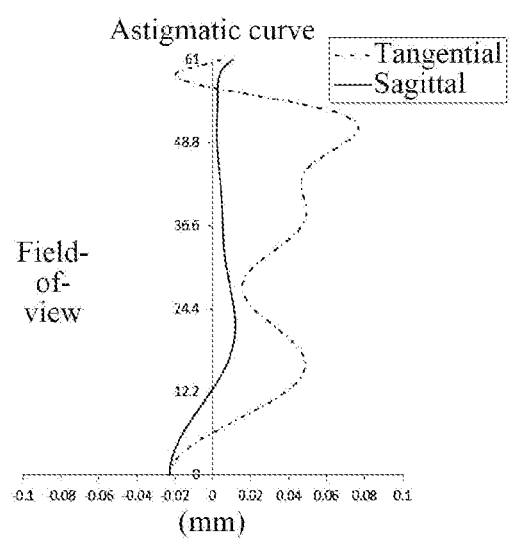
Figures 2C, 2D:
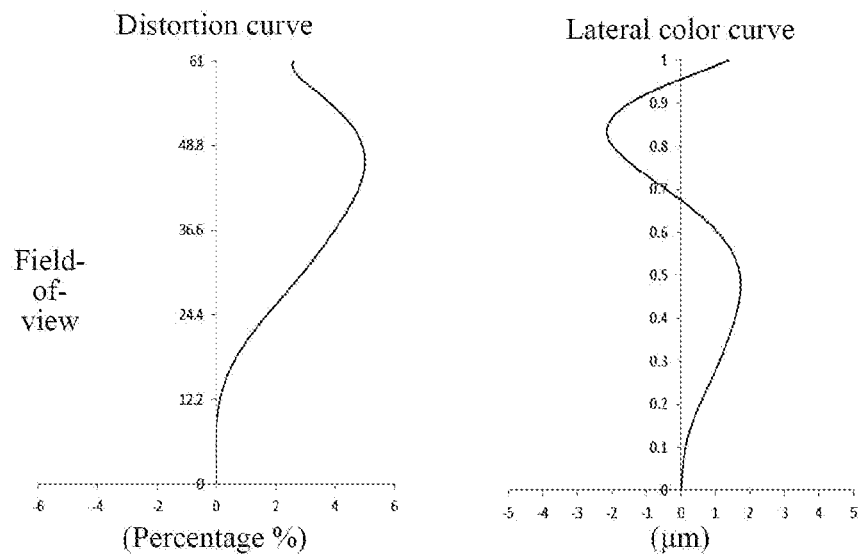

FIG. 2A illustrates a longitudinal aberration curve of the optical imaging lens assembly in Embodiment 1, representing deviations of focal points converged by light of different wavelengths which passes through the lens assembly. FIG. 2B illustrates an astigmatic curve of the optical imaging lens assembly in Embodiment 1, representing a curvature of a tangential image plane and a curvature of a sagittal image plane. FIG. 2C illustrates a distortion curve of the optical imaging lens assembly in Embodiment 1, representing amounts of distortion corresponding to different fields-of-view. FIG. 2D illustrates a lateral color curve of the optical imaging lens assembly in Embodiment 1, representing deviations of different image heights on the image plane formed by light passing through the lens assembly. It can be seen from FIGS. 2A-2D that the optical imaging lens assembly given in Embodiment 1 can achieve a good imaging quality.

Embodiment 2

Figure 3:
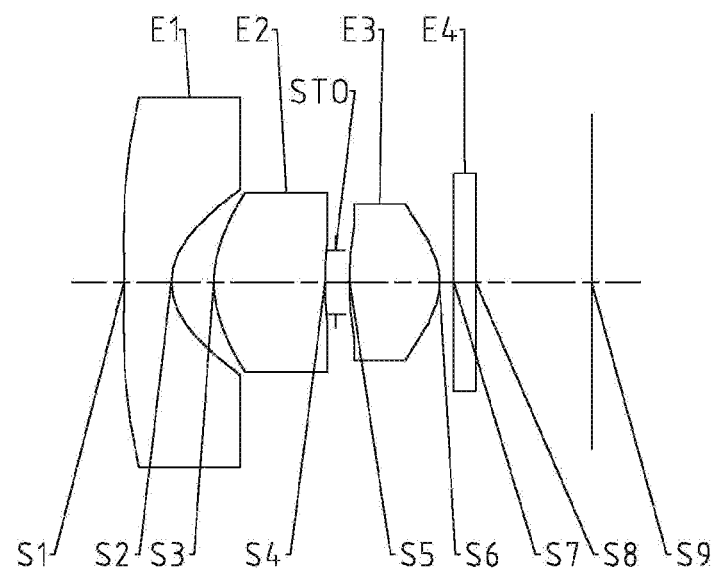
FIG. 3 is a schematic structural diagram of an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 3 shows basic parameters of the optical imaging lens assembly in Embodiment 2. Here, the units of a radius of curvature and a thickness/distance are millimeters (mm). Table 4 shows the high-order coefficients $A_4$, $A_6$, $A_8$, $A_{10}$, $A_{12}$, $A_{14}$, $A_{16}$ and $A_{18}$ applicable to the aspheric surfaces S1-S6 in Embodiment 2. Here, the surface type of each aspheric surface may be defined using the formula (1) given in Embodiment 1.

TABLE 3

| surface number | surface type | radius of curvature | thickness/ distance | material refractive index | abbe number | conic coefficient |
|---|---|---|---|---|---|---|
| OBJ | spherical | infinite | 350.0000 | | | |
| S1 | aspheric | −12.5379 | 0.4548 | 1.54 | 55.7 | 7.8851 |
| S2 | aspheric | 0.5679 | 0.4066 | | | −0.7178 |
| S3 | aspheric | 1.0470 | 1.0699 | 1.67 | 20.4 | −1.2974 |
| S4 | aspheric | 6.6555 | 0.1000 | | | 36.1168 |
| STO | spherical | infinite | 0.1373 | | | |
| S5 | aspheric | 4.6275 | 0.8609 | 1.55 | 56.1 | −8.9724 |
| S6 | aspheric | −0.7118 | 0.1384 | | | −0.8740 |
| S7 | spherical | infinite | 0.2100 | 1.52 | 64.2 | |
| S8 | spherical | infinite | 1.1133 | | | |
| S9 | spherical | infinite | | | | |

TABLE 4

| surface number | A4 | A6 | A8 | A10 |
|---|---|---|---|---|
| S1 | 1.2554E−01 | −1.1803E−01 | 8.1254E−02 | −3.8848E−02 |
| S2 | −1.4699E−01 | −2.4755E+00 | 2.0144E+01 | −8.5825E+01 |
| S3 | −2.4546E−01 | 1.0864E+00 | −4.8917E+00 | 1.5495E+01 |
| S4 | 4.6187E−01 | −7.0475E+00 | 1.1551E+02 | −7.7442E+02 |
| S5 | −4.0486E−01 | 9.0314E+00 | −8.9646E+01 | 5.6472E+02 |
| S6 | 1.1023E−01 | −1.5389E−01 | 1.8497E+00 | −5.5424E+00 |

| surface number | A12 | A14 | A16 | A18 |
|---|---|---|---|---|
| S1 | 1.2370E−02 | −2.4741E−03 | 2.8091E−04 | −1.3915E−05 |
| S2 | 2.0851E+02 | −2.9382E+02 | 2.2251E+02 | −6.9896E+01 |
| S3 | −2.9241E+01 | 2.9097E+01 | −1.1645E+01 | 0.0000E+00 |
| S4 | 7.4619E+02 | 1.5691E+04 | −5.5104E+04 | 0.0000E+00 |
| S5 | −2.0805E+03 | 4.0853E+03 | −3.2947E+03 | 0.0000E+00 |
| S6 | 8.9347E+00 | −4.5744E+00 | 0.0000E+00 | 0.0000E+00 |

Figure 4A:
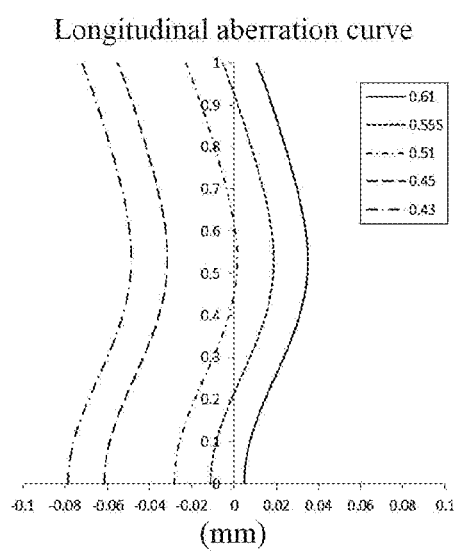
FIGS. 4A-4D respectively illustrate a longitudinal aberration curve, an astigmatic curve, a distortion curve and a lateral color curve of the optical imaging lens assembly in Embodiment 2.
Figure 4B:
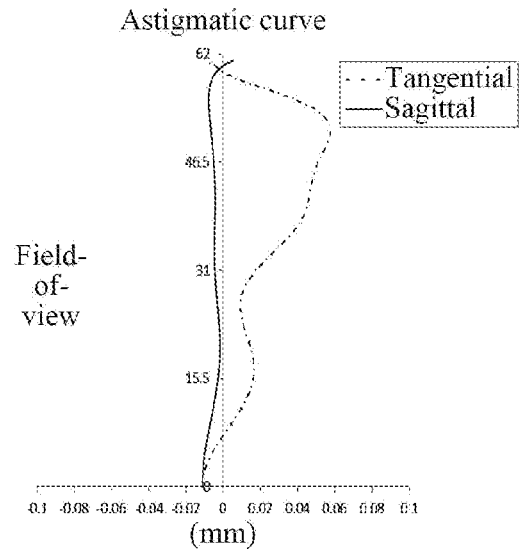
Figure 4C:
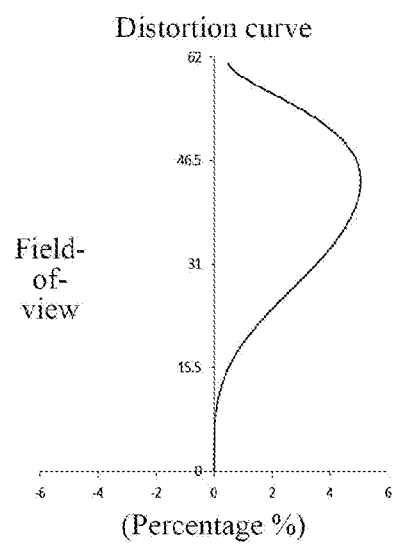
Figure 4D:
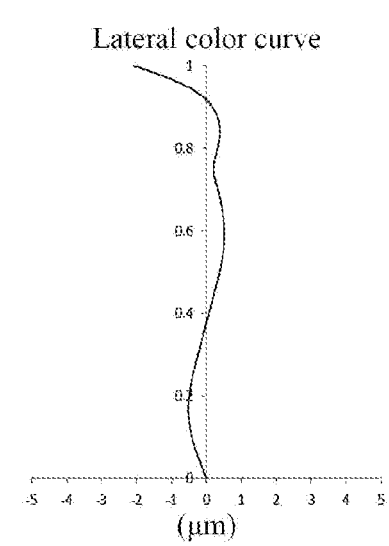

FIG. 4A illustrates a longitudinal aberration curve of the optical imaging lens assembly in Embodiment 2, representing deviations of focal points converged by light of different wavelengths which passes through the lens assembly. FIG. 4B illustrates an astigmatic curve of the optical imaging lens assembly in Embodiment 2, representing a curvature of a tangential image plane and a curvature of a sagittal image plane. FIG. 4C illustrates a distortion curve of the optical imaging lens assembly in Embodiment 2, representing amounts of distortion corresponding to different fields-of-view. FIG. 4D illustrates a lateral color curve of the optical imaging lens assembly in Embodiment 2, representing deviations of different image heights on the image plane formed by light passing through the lens assembly. It can be seen from FIGS. 4A-4D that the optical imaging lens assembly given in Embodiment 2 can achieve a good imaging quality.

Embodiment 3

Figure 5:
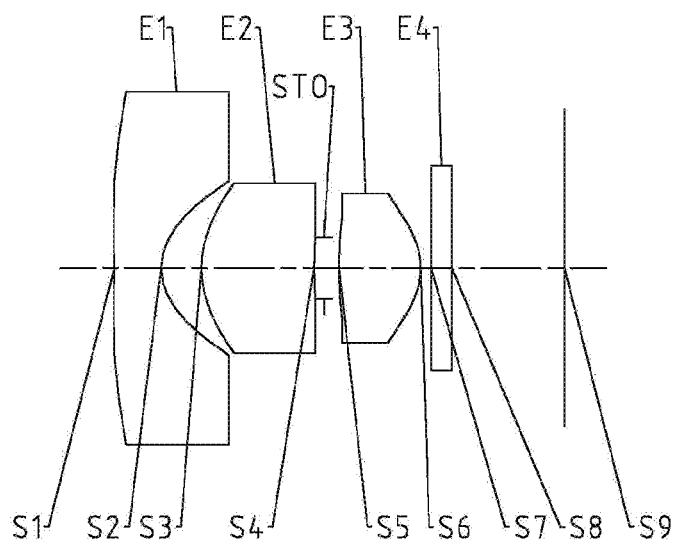
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram of the optical imaging lens assembly according to Embodiment 3 of the present disclosure.

As shown in FIG. 5, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a flat surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 5 shows basic parameters of the optical imaging lens assembly in Embodiment 3. Here, the units of a radius of curvature and a thickness/distance are millimeters (mm). Table 6 shows the high-order coefficients $A_4$, $A_6$, $A_8$, $A_{10}$, $A_{12}$, $A_{14}$, $A_{16}$ and $A_{18}$ applicable to the aspheric surfaces S1-S6 in Embodiment 3. Here, the surface type of each aspheric surface may be defined using the formula (1) given in Embodiment 1.

TABLE 5

| surface number | surface type | radius of curvature | thickness/ distance | material refractive index | abbe number | conic coefficient |
|---|---|---|---|---|---|---|
| OBJ | spherical | infinite | 350.0000 | | | |
| S1 | aspheric | infinite | 0.4729 | 1.54 | 55.7 | 12.8263 |
| S2 | aspheric | 0.5506 | 0.4063 | | | −0.7273 |
| S3 | aspheric | 0.9783 | 1.1400 | 1.64 | 23.3 | −1.1725 |
| S4 | aspheric | 12.3990 | 0.1000 | | | 10.9247 |
| STO | spherical | infinite | 0.1549 | | | |
| S5 | aspheric | 5.8125 | 0.8258 | 1.55 | 56.1 | −44.6729 |
| S6 | aspheric | −0.7325 | 0.1043 | | | −0.8279 |
| S7 | spherical | infinite | 0.2100 | 1.52 | 64.2 | |
| S8 | spherical | infinite | 1.1389 | | | |
| S9 | spherical | infinite | | | | |

TABLE 6

| surface number | A4 | A6 | A8 | A10 |
|---|---|---|---|---|
| S1 | 8.8958E−02 | −5.2587E−02 | 2.3514E−02 | −8.3804E−03 |
| S2 | −2.6413E−01 | −2.0256E+00 | 1.7102E+01 | −6.7774E+01 |
| S3 | −2.3887E−01 | 7.6541E−01 | −2.6315E+00 | 8.3838E+00 |
| S4 | 4.1040E−01 | −5.2585E+00 | 5.6508E+01 | 1.8838E+02 |
| S5 | −3.6052E−01 | 7.0308E+00 | −6.3326E+01 | 3.6011E+02 |
| S6 | 1.2604E−01 | −2.3506E−01 | 2.2397E+00 | −6.6131E+00 |

| surface number | A12 | A14 | A16 | A18 |
|---|---|---|---|---|
| S1 | 2.3569E−03 | −4.9131E−04 | 6.6946E−05 | −4.3631E−06 |
| S2 | 1.5457E+02 | −2.0694E+02 | 1.4946E+02 | −4.4904E+01 |
| S3 | −1.6251E+01 | 1.5984E+01 | −6.1930E+00 | 0.0000E+00 |
| S4 | −7.9766E+03 | 5.6125E+04 | −1.2821E+05 | 0.0000E+00 |
| S5 | −1.1823E+03 | 2.0350E+03 | −1.4035E+03 | 0.0000E+00 |
| S6 | 1.0023E+01 | −5.2278E+00 | 0.0000E+00 | 0.0000E+00 |

Figure 6A:
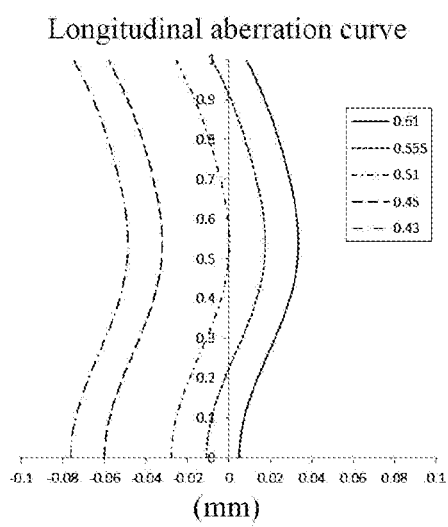
FIGS. 6A-6D respectively illustrate a longitudinal aberration curve, an astigmatic curve, a distortion curve and a lateral color curve of the optical imaging lens assembly in Embodiment 3.
Figure 6B:
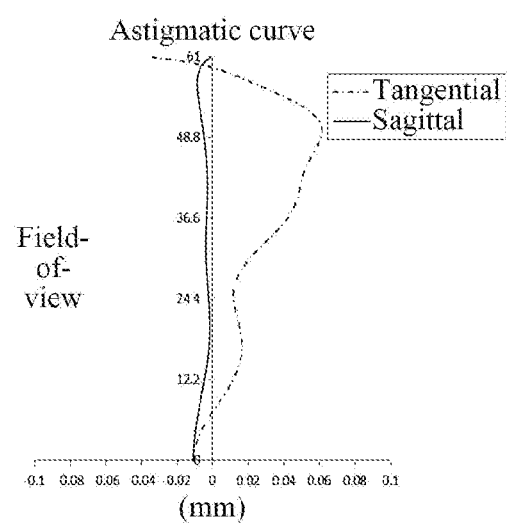
Figures 6C, 6D:
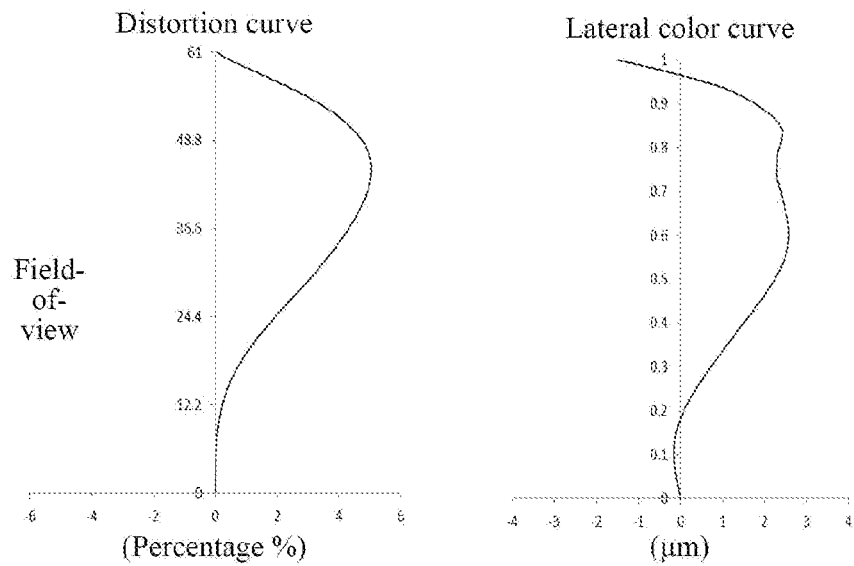

FIG. 6A illustrates a longitudinal aberration curve of the optical imaging lens assembly in Embodiment 3, representing deviations of focal points converged by light of different wavelengths which passes through the lens assembly. FIG. 6B illustrates an astigmatic curve of the optical imaging lens assembly in Embodiment 3, representing a curvature of a tangential image plane and a curvature of a sagittal image plane. FIG. 6C illustrates a distortion curve of the optical imaging lens assembly in Embodiment 3, representing amounts of distortion corresponding to different fields-of-view. FIG. 6D illustrates a lateral color curve of the optical imaging lens assembly in Embodiment 3, representing deviations of different image heights on the image plane formed by light passing through the lens assembly. It can be seen from FIGS. 6A-6D that the optical imaging lens assembly given in Embodiment 3 can achieve a good imaging quality.

Embodiment 4

Figure 7:
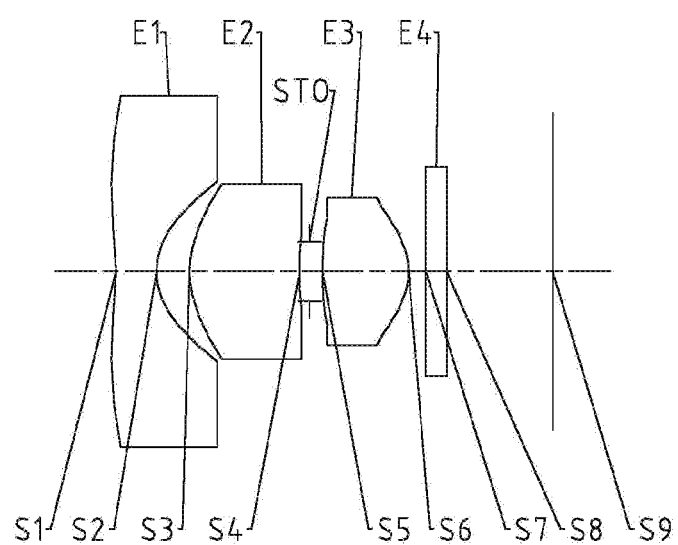
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram of the optical imaging lens assembly according to Embodiment 4 of the present disclosure.

As shown in FIG. 7, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 7 shows basic parameters of the optical imaging lens assembly in Embodiment 4. Here, the units of a radius of curvature and a thickness/distance are millimeters (mm). Table 8 shows the high-order coefficients $A_4$, $A_6$, $A_8$, $A_{10}$, $A_{12}$, $A_{14}$, $A_{16}$ and $A_{18}$ applicable to the aspheric surfaces S1-S6 in Embodiment 4. Here, the surface type of each aspheric surface may be defined using the formula (1) given in Embodiment 1.

TABLE 7

| surface number | surface type | radius of curvature | thickness/ distance | material refractive index | material abbe number | Conic coefficient |
|---|---|---|---|---|---|---|
| OBJ | spherical | infinite | 350.0000 | | | |
| S1 | aspheric | −2.1652 | 0.4104 | 1.54 | 55.7 | −34.9089 |
| S2 | aspheric | 0.6997 | 0.3349 | | | −0.6628 |
| S3 | aspheric | 0.9710 | 1.1171 | 1.67 | 20.4 | −1.4924 |
| S4 | aspheric | 5.9787 | 0.1000 | | | 58.8315 |
| STO | spherical | infinite | 0.1322 | | | |
| S5 | aspheric | 4.5456 | 0.8734 | 1.55 | 56.1 | 2.8816 |
| S6 | aspheric | −0.7080 | 0.1747 | | | −0.8899 |
| S7 | spherical | infinite | 0.2100 | 1.52 | 64.2 | |
| S8 | spherical | infinite | 1.0768 | | | |
| S9 | spherical | infinite | | | | |

TABLE 8

| surface number | A4 | A6 | A8 | A10 |
|---|---|---|---|---|
| S1 | 1.7942E−01 | −2.0241E−01 | 1.5448E−01 | −7.9812E−02 |
| S2 | 1.1230E−02 | −1.3452E+00 | 1.2864E+01 | −6.0440E+01 |
| S3 | −3.5729E−01 | 1.8138E+00 | −7.7225E+00 | 2.1908E+01 |
| S4 | 4.0262E−01 | −3.9331E+00 | 4.3198E+01 | 1.7898E+02 |
| S5 | −3.6148E−01 | 8.5865E+00 | −8.5693E+01 | 5.4532E+02 |
| S6 | 1.1980E−01 | −2.1444E−01 | 2.0020E+00 | −5.4811E+00 |

| surface number | A12 | A14 | A16 | A18 |
|---|---|---|---|---|
| S1 | 2.7276E−02 | −5.8813E−03 | 7.2520E−04 | −3.9140E−05 |
| S2 | 1.5234E+02 | −2.1546E+02 | 1.6080E+02 | −4.9184E+01 |
| S3 | −3.7008E+01 | 3.3322E+01 | −1.2183E+01 | 0.0000E+00 |
| S4 | −6.4243E+03 | 4.4720E+04 | −1.0475E+05 | 0.0000E+00 |
| S5 | −2.0340E+03 | 4.0497E+03 | −3.3170E+03 | 0.0000E+00 |
| S6 | 8.4010E+00 | −4.0236E+00 | 0.0000E+00 | 0.0000E+00 |

Figure 8A:
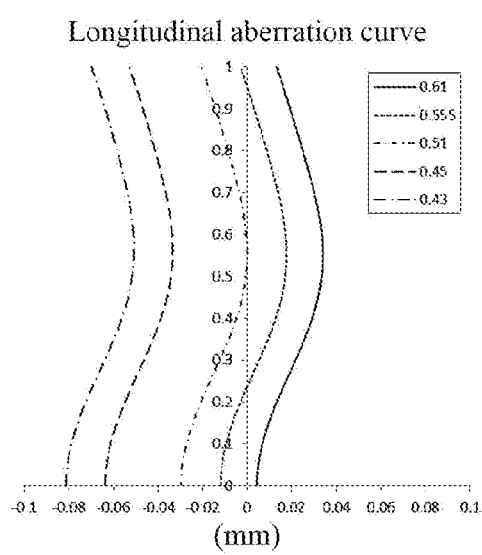
FIGS. 8A-8D respectively illustrate a longitudinal aberration curve, an astigmatic curve, a distortion curve and a lateral color curve of the optical imaging lens assembly in Embodiment 4.
Figure 8B:
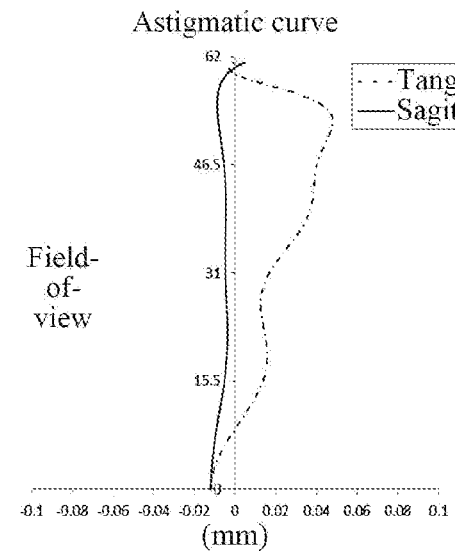
Figure 8C:
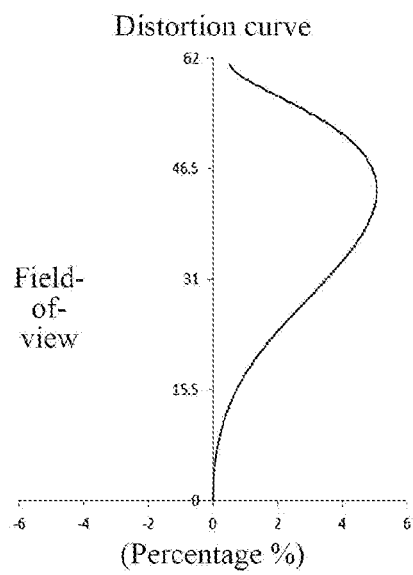
Figure 8D:
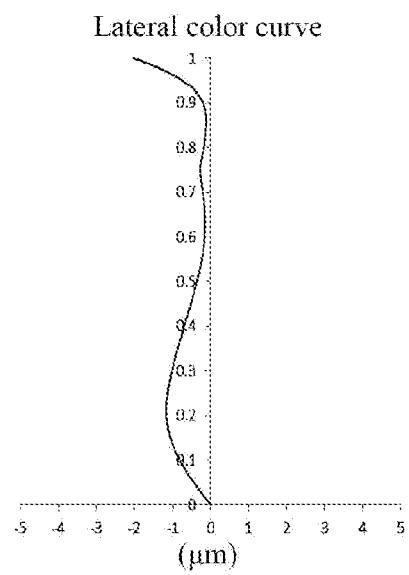

FIG. 8A illustrates a longitudinal aberration curve of the optical imaging lens assembly in Embodiment 4, representing deviations of focal points converged by light of different wavelengths which passes through the lens assembly. FIG. 8B illustrates an astigmatic curve of the optical imaging lens assembly in Embodiment 4, representing a curvature of a tangential image plane and a curvature of a sagittal image plane. FIG. 8C illustrates a distortion curve of the optical imaging lens assembly in Embodiment 4, representing amounts of distortion corresponding to different fields-of-view. FIG. 8D illustrates a lateral color curve of the optical imaging lens assembly in Embodiment 4, representing deviations of different image heights on the image plane formed by light passing through the lens assembly. It can be seen from FIGS. 8A-8D that the optical imaging lens assembly given in Embodiment 4 can achieve a good imaging quality.

Embodiment 5

Figure 9:
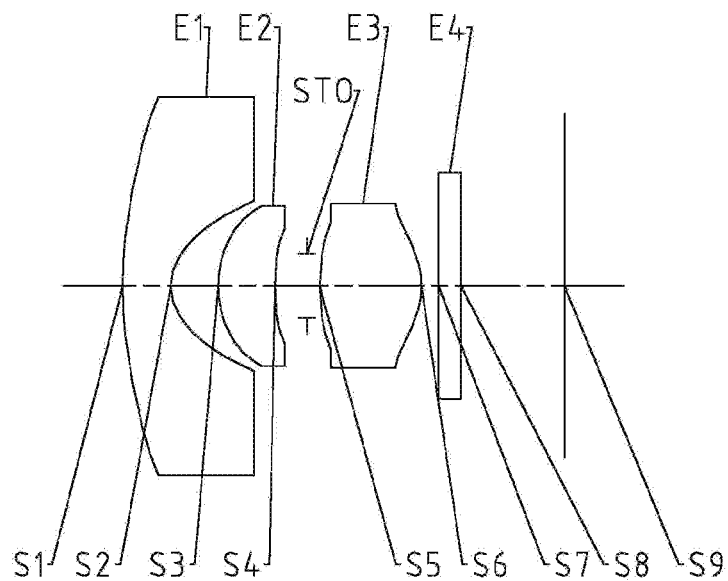
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram of the optical imaging lens assembly according to Embodiment 5 of the present disclosure.

As shown in FIG. 9, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 9 shows basic parameters of the optical imaging lens assembly in Embodiment 5. Here, the units of a radius of curvature and a thickness/distance are millimeters (mm). Table 10 shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S6 in Embodiment 5. Here, the surface type of each aspheric surface may be defined using the formula (1) given in Embodiment 1.

TABLE 9

| surface number | surface type | radius of curvature | thickness/ distance | material refractive index | abbe number | conic coefficient |
|---|---|---|---|---|---|---|
| OBJ | spherical | infinite | infinite | | | |
| S1 | aspheric | 5.5610 | 0.4497 | 1.54 | 55.7 | 5.7199 |
| S2 | aspheric | 0.4924 | 0.4437 | | | −0.7327 |
| S3 | aspheric | 0.9720 | 0.5361 | 1.67 | 20.4 | −0.0100 |
| S4 | aspheric | 3.4818 | 0.2962 | | | 25.0470 |
| STO | spherical | infinite | 0.1190 | | | |
| S5 | aspheric | 2.0128 | 0.9553 | 1.55 | 56.1 | 0.0000 |
| S6 | aspheric | −0.7816 | 0.1604 | | | −1.0949 |
| S7 | spherical | infinite | 0.2100 | 1.52 | 64.2 | |
| S8 | spherical | infinite | 0.9693 | | | |
| S9 | spherical | infinite | | | | |

TABLE 10

| surface number | A4 | A6 | A8 | A10 | A12 |
|---|---|---|---|---|---|
| S1 | 1.1992E−01 | −2.7475E−01 | 3.3266E−01 | −2.6210E−01 | 1.3756E−01 |
| S2 | 4.9683E−01 | −6.7357E+00 | 6.1744E+01 | −3.7741E+02 | 1.4305E+03 |
| S3 | −2.9101E−01 | 5.2577E+00 | −5.5598E+01 | 3.6869E+02 | −1.5394E+03 |
| S4 | 2.5119E−01 | −4.7486E−01 | 1.4868E+01 | −8.6800E+01 | 2.2002E+02 |
| S5 | −1.2061E−01 | 3.3353E+00 | −2.6282E+01 | 1.2617E+02 | −3.5706E+02 |
| S6 | 2.0707E−01 | −4.5010E−01 | 4.3948E+00 | −1.4689E+01 | 2.8944E+01 |

| surface number | A14 | A16 | A18 | A20 |
|---|---|---|---|---|
| S1 | −4.7420E−02 | 1.0280E−02 | −1.2677E−03 | 6.7698E−05 |
| S2 | −3.3441E+03 | 4.6849E+03 | −3.5862E+03 | 1.1430E+03 |
| S3 | 4.1177E+03 | −6.8481E+03 | 6.4663E+03 | −2.6523E+03 |
| S4 | −1.1615E+00 | −5.7271E+02 | 0.0000E+00 | 0.0000E+00 |
| S5 | 5.4621E+02 | −3.4710E+02 | 0.0000E+00 | 0.0000E+00 |
| S6 | −2.9974E+01 | 1.2871E+01 | 0.0000E+00 | 0.0000E+00 |

Figures 10A, 10B:
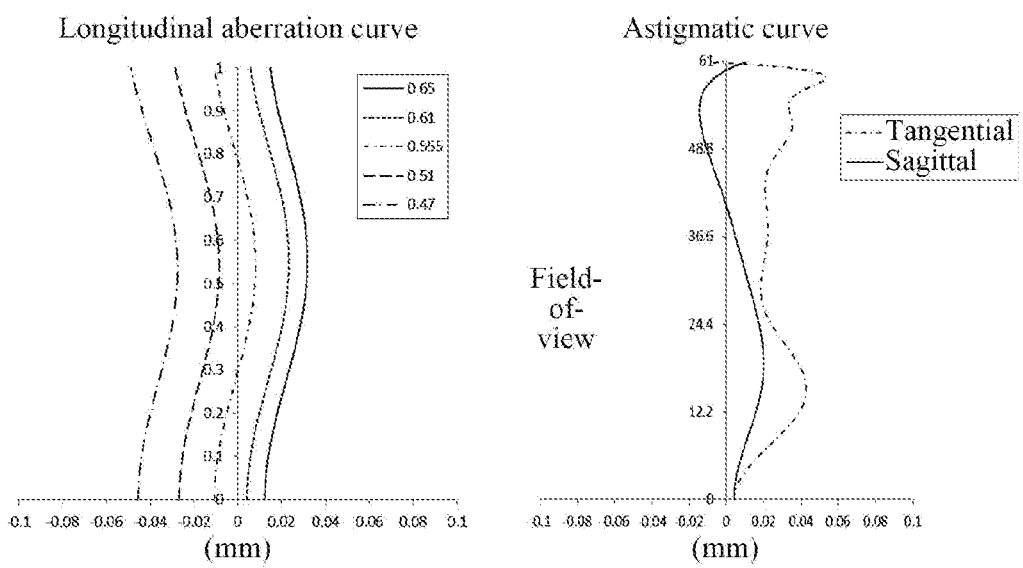
FIGS. 10A-10D respectively illustrate a longitudinal aberration curve, an astigmatic curve, a distortion curve and a lateral color curve of the optical imaging lens assembly in Embodiment 5.
Figures 10C, 10D:
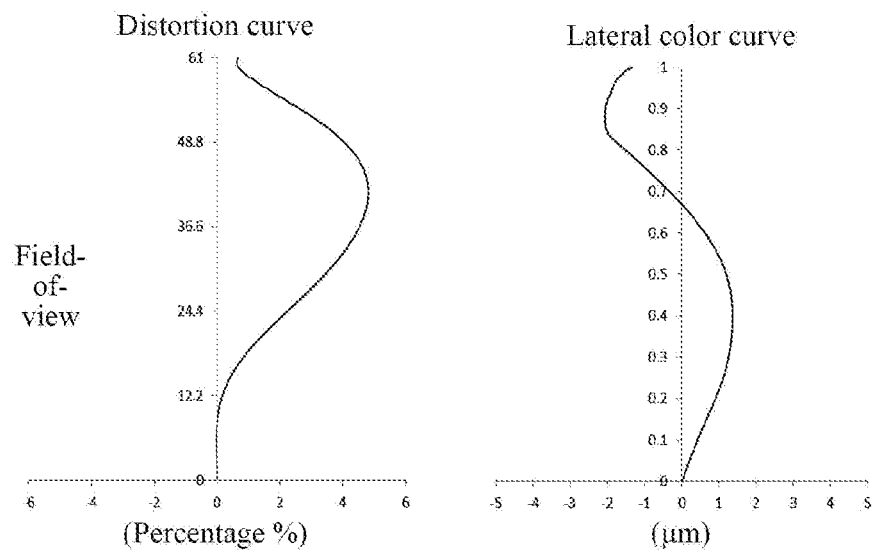

FIG. 10A illustrates a longitudinal aberration curve of the optical imaging lens assembly in Embodiment 5, representing deviations of focal points converged by light of different wavelengths which passes through the lens assembly. FIG. 10B illustrates an astigmatic curve of the optical imaging lens assembly in Embodiment 5, representing a curvature of a tangential image plane and a curvature of a sagittal image plane. FIG. 10C illustrates a distortion curve of the optical imaging lens assembly in Embodiment 5, representing amounts of distortion corresponding to different fields-of-view. FIG. 10D illustrates a lateral color curve of the optical imaging lens assembly in Embodiment 5, representing deviations of different image heights on the image plane formed by light passing through the lens assembly. It can be seen from FIGS. 10A-10D that the optical imaging lens assembly given in Embodiment 5 can achieve a good imaging quality.

Embodiment 6

Figure 11:
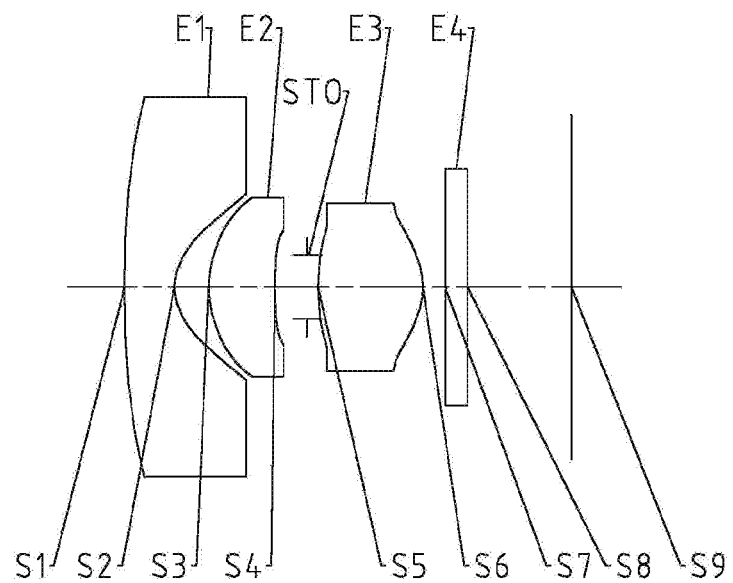
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram of the optical imaging lens assembly according to Embodiment 6 of the present disclosure.

As shown in FIG. 11, the optical imaging lens assembly includes, sequentially along an optical axis from an object side to an image side, a first lens E1, a second lens E2, a diaphragm STO, a third lens E3 and an optical filter E4.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 11 shows basic parameters of the optical imaging lens assembly in Embodiment 6. Here, the units of a radius of curvature and a thickness/distance are millimeters (mm). Table 12 shows the high-order coefficients $A_4$, $A_6$, $A_8$, $A_{11}$, $A_{12}$, $A_{14}$, $A_{16}$, $A_{18}$, $A_{20}$ and $A_{22}$ applicable to the aspheric surfaces S1-S6 in Embodiment 6. Here, the surface type of each aspheric surface may be defined using the formula (1) given in Embodiment 1.

TABLE 11

| surface number | surface type | radius of curvature | thickness/ distance | material refractive index | abbe number | conic coefficient |
|---|---|---|---|---|---|---|
| OBJ | spherical | infinite | 450.0000 | | | |
| S1 | aspheric | 23.4556 | 0.4658 | 1.54 | 55.7 | 42.9418 |
| S2 | aspheric | 0.4977 | 0.3214 | | | −0.7608 |
| S3 | aspheric | 0.9755 | 0.6215 | 1.67 | 20.4 | −1.2341 |
| S4 | aspheric | 4.9520 | 0.3045 | | | 45.4432 |
| STO | spherical | infinite | 0.1003 | | | |
| S5 | aspheric | 2.2811 | 0.9823 | 1.55 | 56.1 | 0.0000 |
| S6 | aspheric | −0.7311 | 0.2087 | | | −1.0535 |
| S7 | spherical | infinite | 0.2100 | 1.52 | 64.2 | |
| S8 | spherical | infinite | 0.9740 | | | |
| S9 | spherical | infinite | | | | |

TABLE 12

| surface number | A4 | A6 | A8 | A10 | A12 |
|---|---|---|---|---|---|
| S1 | 5.8924E−02 | −2.5579E−02 | 2.2037E−02 | −1.9775E−02 | 1.0980E−02 |
| S2 | −2.4354E−01 | −5.7595E+00 | 6.4954E+01 | −4.0319E+02 | 1.5499E+03 |
| S3 | −3.8807E−01 | 3.9388E+00 | −3.1654E+01 | 1.7131E+03 | −5.5886E+02 |
| S4 | 5.1976E−01 | −1.7350E+01 | 3.8409E+02 | −4.7185E+03 | 3.6062E+04 |
| S5 | −6.1868E−01 | 2.7190E+01 | −5.5748E+02 | 6.9865E+03 | −5.4837E+04 |
| S6 | 3.7540E−01 | −3.8803E+00 | 3.8276E+01 | −2.2335E+02 | 8.6109E+02 |

| surface number | A14 | A16 | A18 | A20 | A22 |
|---|---|---|---|---|---|
| S1 | −3.2245E−03 | 3.6756E−04 | 3.8165E−05 | −1.3988E−05 | 1.0066E−06 |
| S2 | −3.7719E+03 | 5.7618E+03 | −5.3411E+03 | 2.7446E+03 | −6.0017E+02 |
| S3 | 1.1178E+03 | −1.3661E+03 | 9.6099E+02 | −3.1948E+02 | 2.0042E+01 |
| S4 | −1.7668E+05 | 5.5415E+05 | −1.0700E+06 | 1.1523E+06 | −5.2777E+05 |
| S5 | 2.7269E+05 | −8.4809E+05 | 1.5688E+06 | −1.5263E+06 | 5.5813E+05 |
| S6 | −2.2084E+03 | 3.7333E+03 | −4.0031E+03 | 2.4825E+03 | −6.8605E+02 |

Figure 12A:
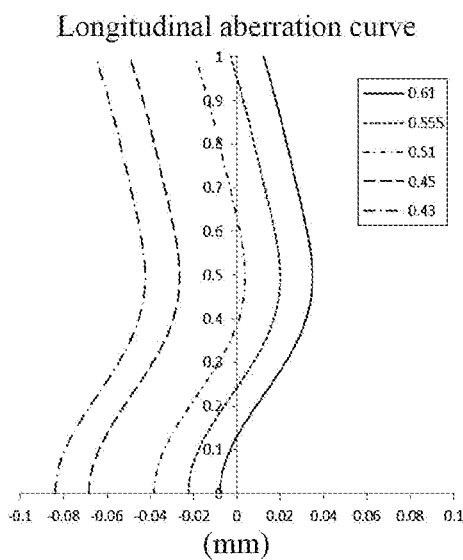
FIGS. 12A-12D respectively illustrate a longitudinal aberration curve, an astigmatic curve, a distortion curve and a lateral color curve of the optical imaging lens assembly in Embodiment 6.
Figure 12B:
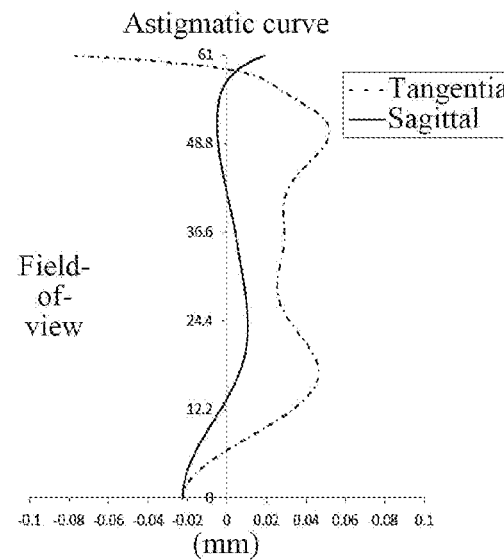
Figure 12C:
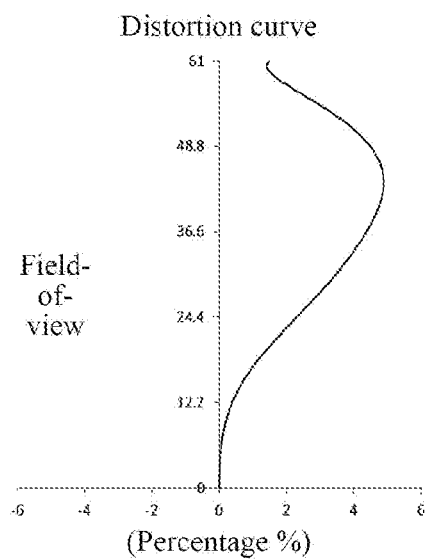
Figure 12D:
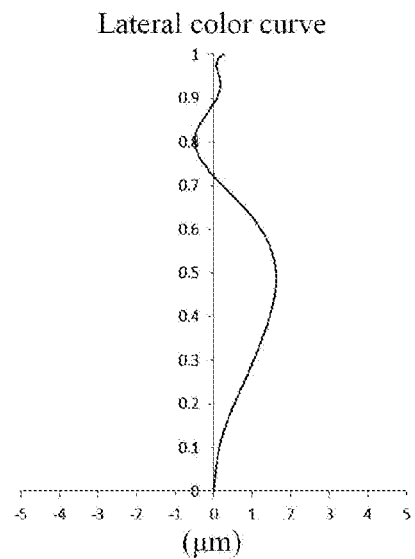

FIG. 12A illustrates a longitudinal aberration curve of the optical imaging lens assembly in Embodiment 6, representing deviations of focal points converged by light of different wavelengths which passes through the lens assembly. FIG. 12B illustrates an astigmatic curve of the optical imaging lens assembly in Embodiment 6, representing a curvature of a tangential image plane and a curvature of a sagittal image plane. FIG. 12C illustrates a distortion curve of the optical imaging lens assembly in Embodiment 6, representing amounts of distortion corresponding to different fields-of-view. FIG. 12D illustrates a lateral color curve of the optical imaging lens assembly in Embodiment 6, representing deviations of different image heights on the image plane formed by light passing through the lens assembly. It can be seen from FIGS. 12A-12D that the optical imaging lens assembly given in Embodiment 6 can achieve a good imaging quality.

In addition, in Embodiments 1-6, the distance TTL from the object-side surface of the first lens to the image plane of the optical imaging lens assembly along the optical axis, the half of the diagonal length ImgH of the effective pixel area on the image plane of the optical imaging lens assembly, the maximal field-of-view FOV of the optical imaging lens assembly, the effective focal length f of the optical imaging lens assembly, the focal length values f1-f3 of the lenses, and the absolute value of the maximal distortion |DISTmax| of the optical imaging lens assembly are as shown in Table 13.

TABLE 13

| parameter | 1 | 2 | 3 | 4 | 5 | 6 |
|---|---|---|---|---|---|---|
| TTL(mm) | 4.13 | 4.49 | 4.56 | 4.43 | 4.14 | 4.19 |
| ImgH(mm) | 1.60 | 1.60 | 1.60 | 1.60 | 1.60 | 1.60 |
| FOV(°) | 121.9 | 122.2 | 121.9 | 122.5 | 121.8 | 121.8 |
| f(mm) | 0.86 | 0.87 | 0.88 | 0.87 | 0.89 | 0.87 |
| f1(mm) | −0.91 | −1.00 | −0.97 | −0.94 | −1.04 | −0.95 |
| f2(mm) | 1.61 | 1.73 | 1.59 | 1.60 | 1.87 | 1.72 |
| f3(mm) | 1.14 | 1.20 | 1.25 | 1.19 | 1.17 | 1.46 |
| |DISTmax|(%) | 4.98 | 4.97 | 4.95 | 5.07 | 4.81 | 4.89 |

Conditional expressions in Embodiments 1-6 respectively satisfy the conditions shown in Table 14.

TABLE 14

| conditional expression | embodiment | | | | | |
|---|---|---|---|---|---|---|
| | 1 | 2 | 3 | 4 | 5 | 6 |
| ImgH × f/EPD(mm) | 3.60 | 3.59 | 3.59 | 3.59 | 3.60 | 3.60 |
| tan(FOV/2) × f(mm) | 1.55 | 1.58 | 1.59 | 1.58 | 1.59 | 1.56 |
| ImgH/f | 1.86 | 1.83 | 1.81 | 1.84 | 1.81 | 1.84 |
| |DISTmax| | 4.98 | 4.97 | 4.95 | 5.07 | 4.81 | 4.89 |
| f1/f | −1.06 | −1.14 | −1.10 | −1.08 | −1.17 | −1.10 |
| (f1 + f3)/f2 | 0.14 | 0.11 | 0.18 | 0.16 | 0.07 | 0.30 |
| R3/R6 | −1.26 | −1.47 | −1.34 | −1.37 | −1.24 | −1.33 |
| CT1/CT2 | 0.74 | 0.43 | 0.41 | 0.37 | 0.84 | 0.75 |
| CT1/CT3 | 0.46 | 0.53 | 0.57 | 0.47 | 0.47 | 0.47 |
| DT11/DT32 | 2.36 | 2.37 | 2.35 | 2.38 | 2.30 | 2.25 |
| CT1/DT11 | 0.26 | 0.26 | 0.27 | 0.23 | 0.25 | 0.26 |
| DT21/DT32 | 1.11 | 1.15 | 1.13 | 1.19 | 0.97 | 1.06 |
| DT12/DT31 | 1.66 | 1.69 | 1.65 | 1.74 | 1.35 | 1.56 |
| DT12/DT21 | 1.04 | 1.03 | 1.03 | 1.03 | 1.07 | 1.04 |
| CT1/SAG12 | 0.67 | 0.69 | 0.69 | 0.67 | 0.57 | 0.69 |
| DT11/ImgH | 1.11 | 1.11 | 1.11 | 1.11 | 1.11 | 1.11 |
| SAG21/CT2 | 0.67 | 0.28 | 0.29 | 0.29 | 0.76 | 0.65 |
| TTL/ImgH | 2.58 | 2.81 | 2.85 | 2.77 | 2.59 | 2.62 |

The present disclosure further provides an imaging apparatus provided with an electronic photosensitive element for forming an image, and the electronic photosensitive element may be a charge coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of protection of the present disclosure is not limited to the technical solution formed by the particular combinations of the above technical features. The scope of protection should also cover other technical solutions formed by any combination of the above technical features or equivalent features thereof without departing from the concept of the present disclosure, such as, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
a first lens, having a negative refractive power, an image-side surface of the first lens being a concave surface;
a second lens, having a positive refractive power, an object-side surface of the second lens being a convex surface; and
a third lens, having a refractive power, an object-side surface of the third lens being a convex surface,
wherein the optical imaging lens assembly satisfies:

3 mm<ImgH×f/EPD<4 mm; and 1 mm<tan(FOV/2)×f<2 mm, wherein ImgH is a half of a diagonal length of an effective pixel area on an image plane of the optical imaging lens assembly, f is an effective focal length of the optical imaging lens assembly, EPD is an entrance pupil diameter of the optical imaging lens assembly, and FOV is a maximal field-of-view of the optical imaging lens assembly.

2. The optical imaging lens assembly according to claim 1, wherein the half of the diagonal length ImgH of the effective pixel area on the image plane of the optical imaging lens assembly and the effective focal length f of the optical imaging lens assembly satisfy:

1.5<ImgH/f<2.

3. The optical imaging lens assembly according to claim 1, wherein a maximal distortion DISTmax of the optical imaging lens assembly satisfies:

|DISTmax|<6%.

4. The optical imaging lens assembly according to claim 1, wherein an effective focal length f1 of the first lens and the effective focal length f of the optical imaging lens assembly satisfy:

−1.3<f1/f<−0.8.

5. The optical imaging lens assembly according to claim 1, wherein an effective focal length f1 of the first lens, an effective focal length f3 of the third lens and an effective focal length f2 of the second lens satisfy:

0<(f1+f3)/f2<0.5.

6. The optical imaging lens assembly according to claim 1, wherein a radius of curvature R3 of the object-side surface of the second lens and a radius of curvature R6 of an image-side surface of the third lens satisfy:

−1.5<R3/R6<−1.

7. The optical imaging lens assembly according to claim 1, wherein a center thickness CT1 of the first lens on the optical axis and a center thickness CT2 of the second lens on the optical axis satisfy:

0.3<CT1/CT2<1.

8. The optical imaging lens assembly according to claim 1, wherein a center thickness CT1 of the first lens on the optical axis and a center thickness CT3 of the third lens on the optical axis satisfy:

0.3<CT1/CT3<0.7.

9. The optical imaging lens assembly according to claim 1, wherein a maximal effective radius DT11 of an object-side surface of the first lens and a maximal effective radius DT32 of an image-side surface of the third lens satisfy:

2<DT11/DT32<2.5.

10. The optical imaging lens assembly according to claim 1, wherein a center thickness CT1 of the first lens on the optical axis and a maximal effective radius DT11 of an object-side surface of the first lens satisfy:

0.2<CT1/DT11<0.5.

11. The optical imaging lens assembly according to claim 1, wherein a maximal effective radius DT21 of the object-side surface of the second lens and a maximal effective radius DT32 of an image-side surface of the third lens satisfy:

0.9<DT21/DT32<1.3.

12. The optical imaging lens assembly according to claim 1, wherein a maximal effective radius DT12 of the image-side surface of the first lens and a maximal effective radius DT31 of the object-side surface of the third lens satisfy:

1.3<DT12/DT31<2.

13. The optical imaging lens assembly according to claim 1, wherein a maximal effective radius DT12 of the image-side surface of the first lens and a maximal effective radius DT21 of the object-side surface of the second lens satisfy:

1<DT12/DT21<1.2.

14. The optical imaging lens assembly according to claim 1, wherein a center thickness CT1 of the first lens on the optical axis and an axial distance SAG12 from an intersection point of the image-side surface of the first lens and the optical axis to a vertex of an effective radius of the image-side surface of the first lens satisfy:

0.5<CT1/SAG12<1.

15. The optical imaging lens assembly according to claim 1, wherein a maximal effective radius DT11 of an object-side surface of the first lens and the half of the diagonal length ImgH of the effective pixel area on the image plane of the optical imaging lens assembly satisfy:

1<DT11/ImgH<1.3.

16. The optical imaging lens assembly according to claim 1, wherein an axial distance SAG21 from an intersection point of the object-side surface of the second lens and the optical axis to a vertex of an effective radius of the object-side surface of the second lens and a center thickness CT2 of the second lens on the optical axis satisfy:

0.2<SAG21/CT2<1.

17. The optical imaging lens assembly according to claim 1, wherein a distance TTL from an object-side surface of the first lens to the image plane of the optical imaging lens assembly along the optical axis and the half of the diagonal length ImgH of the effective pixel area on the image plane of the optical imaging lens assembly satisfy:

2<TTL/ImgH<3.

18. An optical imaging lens assembly, comprising, sequentially along an optical axis from an object side to an image side:
a first lens, having a negative refractive power, an image-side surface of the first lens being a concave surface;
a second lens, having a positive refractive power, an object-side surface of the second lens being a convex surface; and a third lens, having a refractive power, an object-side surface of the third lens being a convex surface, wherein the optical imaging lens assembly satisfies:

$3 \text{ mm} < \text{ImgH} \times f/\text{EPD} < 4 \text{ mm}$; and $1.5 < \text{ImgH}/f < 2$, wherein ImgH is a half of a diagonal length of an effective pixel area on an image plane of the optical imaging lens assembly, f is an effective focal length of the optical imaging lens assembly, and EPD is an entrance pupil diameter of the optical imaging lens assembly.

19. The optical imaging lens assembly according to claim 18, wherein a maximal distortion DISTmax of the optical imaging lens assembly satisfies:

$|\text{DISTmax}| < 6\%$.

20. The optical imaging lens assembly according to claim 19, wherein a maximal field-of-view FOV of the optical imaging lens assembly and the effective focal length f of the optical imaging lens assembly satisfy:

$1 \text{ mm} < \tan(\text{FOV}/2) \times f < 2 \text{ mm}$.

* * * * *